Oct. 29, 1968     K. A. HEWITT     3,408,103
FOLDING SEAT ASSEMBLY
Filed July 2, 1965     2 Sheets-Sheet 1
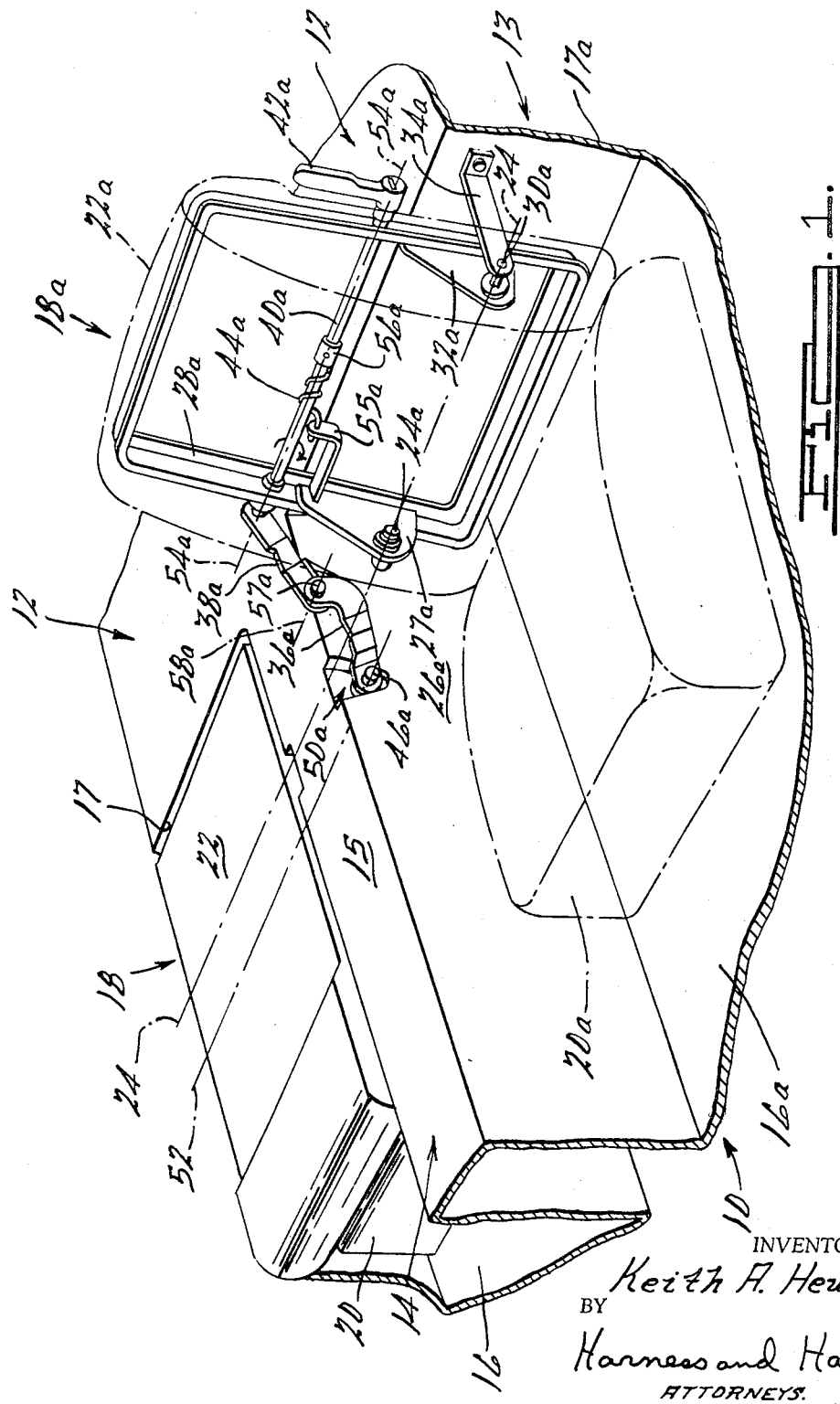
INVENTOR.
Keith A. Hewitt
BY
Harness and Harris
ATTORNEYS.

Oct. 29, 1968    K. A. HEWITT    3,408,103
FOLDING SEAT ASSEMBLY
Filed July 2, 1965    2 Sheets-Sheet 2
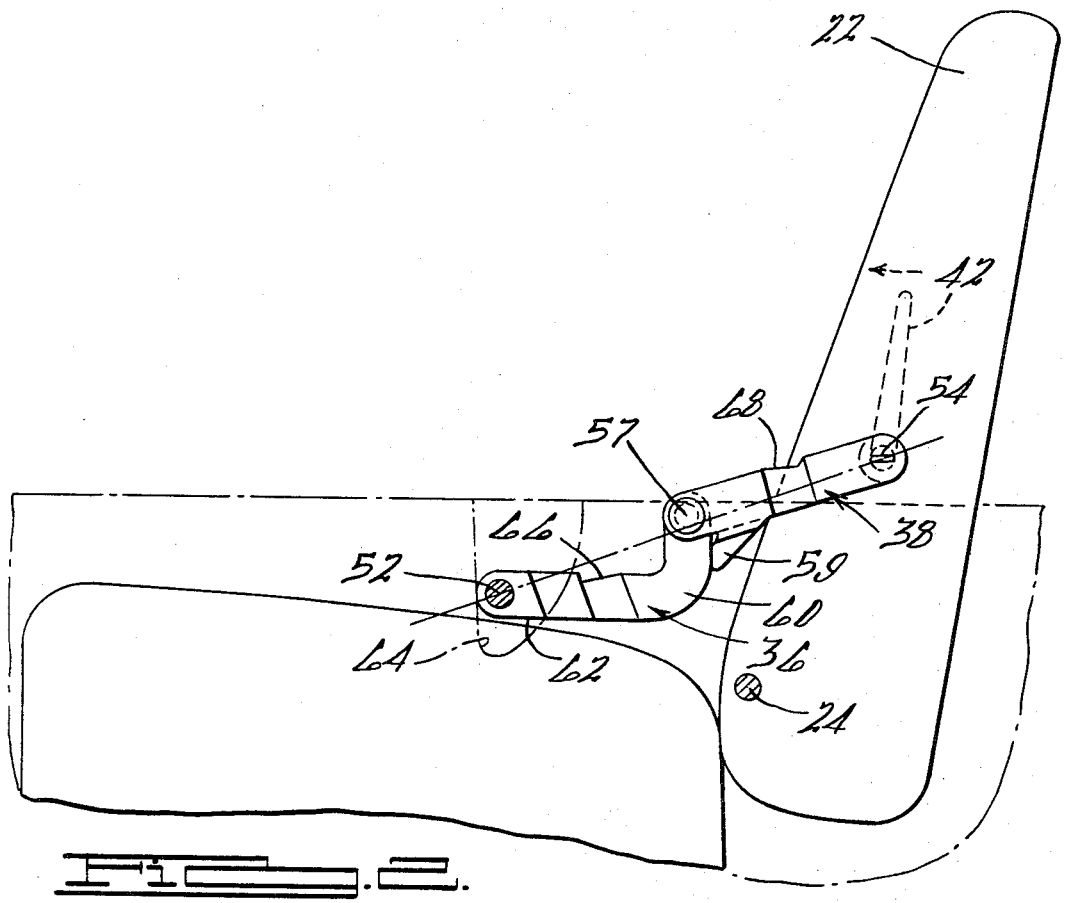
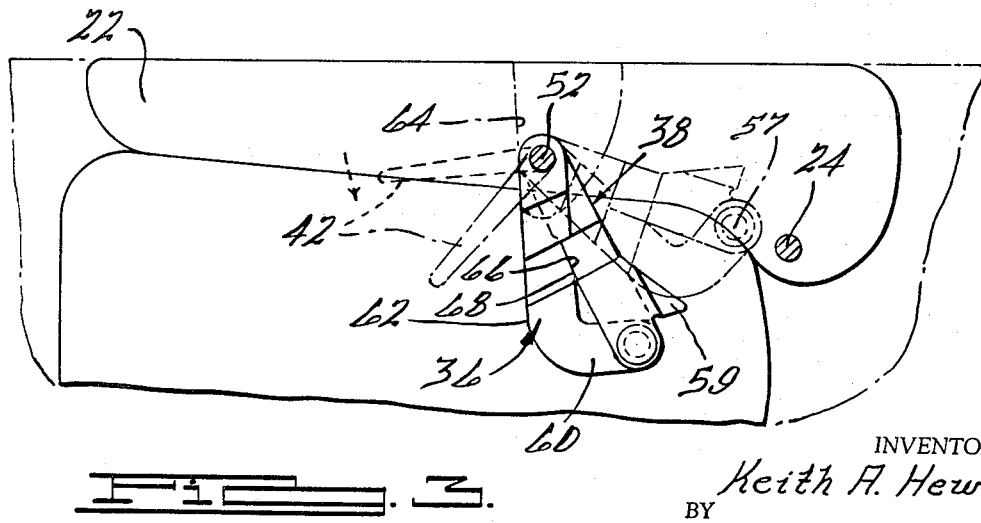
INVENTOR.
Keith A. Hewitt
BY
Harness and Harris
ATTORNEYS.

United States Patent Office 3,408,103
Patented Oct. 29, 1968

3,408,103
FOLDING SEAT ASSEMBLY
Keith A. Hewitt, Highland, Mich., assignor to Chrysler Corporation, Highland Park, Mich., a corporation of Delaware
Filed July 2, 1965, Ser. No. 469,275
25 Claims. (Cl. 296—66)

ABSTRACT OF THE DISCLOSURE

This invention relates to a folding seat assembly for use with a multi-purpose vehicle body. The seat assembly includes a seat back mounted for movement between a generally upright seating position and a horizontal position and a locking mechanism responsive to movement of the seat back to each of its positions to lock the seat back in that position. The locking mechanism includes a handle mounted on the seat back for unlocking the seat back.

---

The seating arrangement in a multi-purpose vehicle body generally includes a front seat and a foldable second or rear seat located rearwardly of the front seat and movable between a normal passenger-carrying position and a folded load-carrying position. The portion of the vehicle body floor rearwardly of the second seat is normally elevated above the level of the floor portion supporting the seats so as to provide clearance for the rear wheel and axle structure of the vehicle. With the second seat in folded position, the back of this seat is disposed above the seat bottom, with the back surface of the seat back located substantially flush with the elevated rear floor portion. Latch means are also provided to maintain the seat back in its upright or seating position. These latch means typically include latch elements on the seat back for coaction with complementary latch elements located on the wheel housings.

Folding seat assemblies as described above, while generally satisfactory, have certain disadvantages.

Specifically, the latch elements on the wheel housings and the latch elements on the rear face of the seat back are objectionable from an appearance standpoint, particularly with the seat in folded position. They are also objectionable from a safety standpoint since they present protruding and sometimes sharp edges. They are also objectionable from a convenience standpoint since they tend to interfere with the loading of the cargo area.

The prior art folding second seat assemblies are also objectionable in that either they have no provision for maintaining the seat back in its folded position or, if such provision is made, a difficult and rather clumsy operation is required to release the seat back for movement to its seating position.

Further, the prior art assemblies in general require a rather high operator effort to latch the seat back in its upright seating position.

Accordingly, it is an object of the present invention to provide an improved folding seat assembly.

It is a more specific object to provide an improved folding seat assembly for use with a multi-purpose vehicle body.

A yet more specific object is to provide such a seat assembly which, particularly when in its folded or cargo-carrying position, will present a smooth, uncluttered appearance.

A related object is to provide such a seat assembly which, particularly when in its folded or cargo-carrying position, will be relatively free of protrusions or exposed edges in the cargo area, whereby to facilitate loading of the vehicle and contribute importantly to its overall safety.

Yet another object is to provide such a seat assembly which will maintain the seat back firmly in its folded position but which will allow the seat back to be readily and easily released for movement to its seating position.

Yet another object is to provide such a seat assembly which will require relatively little operator effort to latch the seat back in its upright position and yet which will firmly maintain the seat back in that position.

According to a primary feature of the invention, the latch means for the seat assembly is comprised essentially of only two links. One link is pivoted at one end about a fixed axis located generally forwardly of the pivotal axis of the seat back. The other link has the same effective length as the first link and is pivoted at one end on the seat back at a location thereon generally above the pivotal axis of the seat back with the latter in its upright or seating position. The two link axes are spaced equidistant from the pivotal axis of the seat back and the free ends of the links are pivotally interconnected. Thus, as the seat back is pivoted forwardly toward its folded position, the pivotal axis of the link on the seat back moves into a position of coincidence with the pivotal axis of the other link, whereby to allow the links to thereafter pivot downwardly together about their coincident axes to move the pivotal axis of their interconnected ends to an over center position with respect to the coincident link axes and the pivotal axis of the seat back. In this over center position, the links act to positively prevent displacement of the seat back out of its folded position.

According to another feature of the invention, spring means are provided which are operative upon movement of the link axes into coincident relationship to pivot the links downwardly to their over center position, thereby assuring that the links will move automatically and positively to their over center position upon lowering of the seat back.

According to yet another feature of the invention, the aforesaid spring means are arranged to store energy in response to the pivotal movement of the link on the seat back relative to the seat back occurring upon movement of the seat back toward its folded position, whereby the spring means releases energy upon movement of said link axes into coincident relationship to pivot the links downwardly to their over center position.

According to another feature of the invention, the effective length of each link is no greater than the distance between the pivotal axis of the seat back and the pivotal axis of the link on the seat back so that as the seat back is moved upwardly toward its seating position, the axes of the links and the axis of the pivotal interconnection of the links move into a position of alignment to define the upright seating position of the seat back. As the links assume this position of alignment, the spring means acting on the link on the seat back aided by the momentum of the interconnected ends of the links, moves the axis of the pivotal interconnection into an over center relationship with respect to the pivotal axes of the remote ends of the links. Thus, with the seat back in upright position, the links act to prevent displacement of the seat back toward its folded position.

These and other objects, features, and advantages of the invention will be apparent from the following detailed description of a preferred embodiment of the invention and from the accompanying drawings wherein:

FIG. 1 is a fragmentary perspective view of a multi-purpose vehicle body incorporating folding second seat assemblies according to the invention;

FIG. 2 is a side view of one of the folding seat assemblies of FIG. 1 showing the seat back in upright or seating position; and FIG. 3 is a view similar to FIG. 2 but showing the seat back in folded or cargo-carrying position.

The multi-purpose vehicle body of FIG. 1 includes a relatively depressed vehicle floor portion 10 and a cargo-carrying portion 12 elevated above the level of portion 10 to provide clearance for the rear wheel and axle structure (not shown). A step or riser floor portion 13 joins floor portions 10 and 12.

A drive shaft tunnel 14 extends along the longitudinal center line of the vehicle to divide floor portion 10 into a right-hand portion 16 and a left-hand portion 16a, and divide riser 13 into left and right portions 17 and 17a. The upper surface 15 of drive shaft tunnel 14 is flat and at the level of elevated floor portion 12 so as to form therewith a flat, continuous cargo floor area.

Floor portions 16 and 16a respectively support folding second seat assemblies 18 and 18a.

Seat assemblies 18 and 18a are identical except for hand. Like parts in the two assemblies have the same number except that the numbers for assembly 18a carry an "a" suffix.

Seat assemblies 18 and 18a each include a seat bottom 20, 20a and a seat back 22, 22a. The cushion outline of the seat bottom and seat back of seat assembly 18a are shown in phantom in FIG. 1 to reveal the inner seat hardware.

Seat bottoms 20 and 20a are stationary.

Each seat back is mounted for pivotal movement between a generally upright seating position (see seat back 22a in FIG. 1) and a generally horizontally cargo-carrying position (see seat back 22 in FIG. 1).

In its upright seating position, the seat back extends upwardly above the level of elevated floor portion 12 and tunnel surface 15.

In its cargo-carrying position, the seat back extends forwardly to overlie the related seat bottom. In this position, its back surface is substantially flush with surface 15 and floor 12 to form therewith a continuous, substantially flat cargo floor.

Seat back 22a is mounted at its inboard side by a pivot pin 24a carried on the adjacent side wall 26a of tunnel 14 and received by a bracket 27a projecting forwardly from seat back frame 28a. Seat back 22a is mounted at its outboard side by a pivot pin 30a received by a bracket 32a projecting forwardly from frame 28a. Pivot pin 30a is supported by a bracket 34a projecting forwardly from step floor portion 17a. Pins 24a and 30a thus support seat back 22a for pivotal movement about a horizontal axis 24. It will be understood that seat back 22 is similarly supported for pivotal movement about axis 24.

Each seat assembly also includes a mechanism for latching or locking the seat back in its upright and folded positions.

The latch or lock mechanism for seat assembly 18a includes a first link 36a, a second link 38a, a shaft 40a, a handle 42a, and a coil spring 44a wound around shaft 40a.

Link 36a is mounted at one end on a pivot pin 46a projecting from a recess 50a formed in wall 26a. Pin 46a mounts link 36a for pivotal movement about a fixed axis 52.

Shaft 40a is journalled in the side rails of frame 28a for rotation about a horizontal axis 54a. Axis 54a is the same distance from axis 24 as axis 52 is from axis 24.

Link 38a has the same effective length as link 36a and is keyed at one end to shaft 40a so as to be pivotal about axis 54a. Handle 42a is keyed to the end of shaft 40a remote from link 38a.

Spring 44a is anchored at one end to a bracket 55a rigid with the seat frame and at its other end to a collar 56a rigid with shaft 40a. Spring 44a is preloaded; in the position of FIG. 1, spring 44a has a windup of about 90° so as to continuously urge shaft 40a and link 38a in the direction of the arrow.

A pin 57a interconnects the free ends of links 36a and 38a to mount the links for relative pivotal movement about the pin axis 58a.

As seat back 22a is pivoted forwardly about axis 24 toward its folded position, links 36a and 38a buckle downwardly at pin 57a and axis 54a moves along an arc centered on axis 24. As seat back 22a reaches its folded position, axis 54a moves into a position of coincidence with fixed axis 52, whereafter the links are free to pivot downwardly together about coincident axes 52 and 54a to move the pivotal axis 57a to an over center position with respect to coincident axes 52 and 54a and thereby prevent displacement of the seat back out of its folded position.

The operation of the latch mechanism is depicted in sequential manner in FIGS. 2 and 3. It will be understood that FIGS. 2 and 3 are of right-hand seat assembly 18.

With seat back 22 in its upright seating position (FIG. 2), links 36 and 38 are in substantial alignment except that axis 57 is slightly over center with respect to axes 52 and 54 with the extent of over center movement limited and determined by engagement of a dog or tang 59 on link 38 with the edge surface of an offset portion 60 of link 36. The links are maintained in their over center position by the aforementioned preloading of spring 44.

When it is desired to lower the seat back, handle 42 is pulled in the direction of the arrow in FIG. 2 to move axis 57 back over center, whereafter seat back 22 may be pivoted downwardly about axis 24.

As seat back 22 pivots downwardly, axis 57 moves downwardly along an arc centered on axis 52 and axis 54 moves downwardly along an arc centered on axis 24. As seat back 22 reaches its folded position, axis 54 moves into a position of coincidence with axis 52 and axis 57 moves into a position of alignment with axes 52 and 24. This position of the links is shown in dash lines in FIG. 3.

As soon as the links assume this dash line position, spring 44, which as noted has an appropriate 90° prewind in the FIG. 1 position and has been wound through an additional 45° or so in response to the downward movement of the seat back to the FIG. 2 position, unwinds to pivot the links downwardly together about axis 52 to their solid line position of FIG. 3. The solid line position of the links in FIG. 3 is determined by the engagement of a side edge surface 62 of link 36 with the adjacent side wall 64 of recess 50. Links 36 and 38 are bent at their midsections so that they cross as axis 54 approaches its position of coincidence with axis 52 to bring edge surface 66 on the bent midsection of link 36 into abutment with edge surface 68 on the bent midsection of link 38. Abutment of these surfaces occurs just as axis 54 reaches its position of coincidence with axis 52, thereby ensuring that axis 54 will not move beyond axis 52 and ensuring that the links will be free to accomplish the desired downward pivotal movement about coincident axes 52 and 54.

Movement of the links 36, 38 to the solid line position of FIG. 3 disposes axis 57 in an over center position with respect to axes 52 and 24 so that the seat back is firmly locked in its down position.

With the seat back in its down position, handle 42 extends generally forwardly from shaft 40 adjacent the outboard edge of the folded seat back.

When it is desired to raise the seat back to its upright seating position, handle 42 is depressed in the direction of the arrow in FIG. 3 to pivot links 36, 38 upwardly together about coincident axes 52, 54. This movement increases the windup of spring 44. As soon as axis 57 reaches a position of alignment with axes 52 and 24 (the dash line position of FIG. 3), the force of spring 44 and the force generated by the resiliency of the mutually compressed seat cushions combine to "pop" seat back 22 out of its folded position and move it upwardly a short distance toward its upright position. The seat back may thereafter be grasped and pivoted about axis 24 toward its upright position of FIG. 1. As axis 57 reaches a position of alignment with axes 52 and 54, spring 44 snaps axis 57 over center with respect to axes 52 and 54 and moves tang 59 into abutment with the adjacent edge surface of link portion 60. Movement of the seat back to its up position thus automatically locks it in that position.

While a preferred embodiment of the invention has been illustrated and described in detail, it is to be understood that various changes may be made in the disclosed embodiment without departing from the scope or spirit of the invention as defined by the appended claims.

I claim:

1. In a motor vehicle body of the type including a floor having an elevated cargo-carrying portion:
   (A) a vehicle seat comprising
      (1) a seat bottom and
      (2) a seat back;
   (B) means mounting said seat back on said body for movement between
      (1) a generally upright seating position wherein said seat back extends upwardly above said elevated floor portion adjacent thereto and
      (2) a generally horizontal cargo-carrying position wherein said seat back is substantially flush with said elevated floor portion; and
   (C) A lock mechanism, including a handle movably mounted on said seat back, operative
      (1) in response to movement of said seat back to each of its said upright and horizontal positions, to lock said seat back in that position and prevent return movement of said seat back from that position and
      (2) in response to movement of said handle relative to said seat back with the latter in each of its said positions, to unlock said seat back and allow return movement of said seat back from that position.

2. In a motor vehicle body of the type including a floor having an elevated cargo-carrying portion:
   (A) a vehicle seat comprising
      (1) a seat bottom and
      (2) a seat back;
   (B) means mounting said seat back on said body for pivotal movement between
      (1) a generally upright seating position wherein said seat back extends upwardly above said elevated floor portion adjacent thereto and
      (2) a generally horizontal folded position wherein said seat back is substantially flush with said elevated floor portion;
   (C) a first link pivoted at one end about a first link axis located on said body generally forwardly of the pivotal axis of said seat back and at a given distance therefrom;
   (D) a second link having the same effective length as said first link and pivoted at one end about a second link axis
      (1) located on said seat back at said given distance from said seat back axis and
      (2) spaced, with said seat back in its said upright seating position, generally above said seat back axis; and
   (E) means pivotally interconnecting the free ends of said first and second links, said links being of such a dimension and oriented so that said seat back is pivoted forwardly toward its folded position, said second link axis moves into a position of coincidence with said first link axis, whereby to allow said links to thereafter pivot downwardly together about their coincident axis to move the pivotal axis of their interconnected ends to an over center position with respect to said coincident axes and said seat back axis and thereby resist displacement of said seat back from its said folded position.

3. A seating assembly according to claim 2 and further including:
   (A) a handle mounted for pivotal movement about said second link axis and fixed with respect to said second link, whereby pivotal movement of said handle raises the interconnected link axis back to a position of alignment with said seat back axis and said coincident axes, whereafter said seat back may be raised to its upright seating position.

4. A seat assembly according to claim 2 and further including:
   (A) coacting stop surfaces on said links positioned to move into abutment as said second link axis moves into its position of coincidence with said first link axes, whereby to prevent movement of said second link axes past said first link axis.

5. In a motor vehicle body of the type including a floor having an elevated cargo-carrying portion:
   (A) a vehicle seat comprising
      (1) a seat bottom and
      (2) a seat back;
   (B) means mounting said seat back on said body for counterclockwise pivotal movement from
      (1) a generally upright seating position wherein said seat back extends upwardly above said elevated floor portion adjacent thereto to
      (2) a generally horizontal folded position wherein said seat back is substantially flush with said elevated floor portion;
   (C) a first link pivoted at one end about a first link axis located on said body generally forwardly of the pivotal axis of said seat back and at a given distance therefrom;
   (D) a second link having the same effective length as said first link and pivoted at one end about a second link axis
      (1) located on said seat back at said given distance from said seat back axis and
      (2) spaced, with said seat back in its said seating position, generally above said seat back axis;
   (E) means pivotally interconnecting the free ends of said first and second links; and
   (F) means blocking counterclockwise pivotal movement of the pivotal axis of said interconnected ends about said first link axis, said links being of such a dimension and oriented so that as said seat back is pivoted forwardly toward its folded position, said second link axis pivots counterclockwise about said seat back axis into a position of coincidence with said first link axis and said interconnected pivotal axis moves clockwise about said first link axis to a position of alignment with said first link axis and said seat back axis, whereby to allow said links to thereafter pivot clockwise downwardly together about their coincident axes to move said interconnected pivotal axis to an over center position with respect to said coincident axes and said seat back axis and thereby resist displacement of said seat back from its said folded position.

6. In a motor vehicle body of the type including a floor having an elevated cargo-carrying portion:
   (A) a vehicle seat comprising
      (1) a seat bottom and
      (2) a seat back;
   (B) means mounting said seat back on said body for pivotal movement between
      (1) a generally upright seating position wherein said seat back extends upwardly above said elevated floor portion adjacent thereto and
      (2) a generally horizontal cargo-carrying position wherein said seat back is substantially flush with said elevated floor portion;
   (C) a first link pivoted at one end about a first link axis located on said body generally forwardly of the pivotal axis of said seat back and at a given distance therefrom;
   (D) a second link having the same effective length as said first link and pivoted at one end about a second link axis (1) located on said seat back at said given distance from said seat back axis and
(2) spaced, with said seat back in its said upright seating position, generally above said seat back axis;
(E) means pivotally interconnecting the free ends of said first and second links, said links being of such a dimension and oriented so that as said seat back is pivoted toward its upright position the pivotal axis of the interconnected link ends moves in one direction along an arc centered on said first link axis and as said seat back is pivoted toward its folded position said interconnected axis moves in the opposite direction along said arc;
(F) first coacting stop surfaces on said links positioned to move into abutment as said interconnected axis moves in said one direction along said arc through a position of alignment with said first and second link axes to an over center position slightly beyond its aforesaid position of alignment, whereby to prevent further movement of said interconnected axis along said arc in said given direction and thereby define the upright position of said seat back and prevent displacement of the latter from that position; and
(G) second coacting stop surfaces on said links positioned to move into abutment as said interconnected axis moves along said arc in said opposite direction to a position of alignment with said first link axis and said seat back axis, whereby said first and second links may thereafter pivot downwardly together about the coincident first and second link axes to move said interconnected axis further along said arc in said opposite direction to an over center position with respect to said coincident axes and said seat back axis and thereby prevent displacement of said seat back from its said folded position.

7. A seating assembly according to claim 6 and further including
(A) a handle mounted for pivotal movement on said second link axis and fixed with respect to said second link, whereby
(1) pivotal movement of said handle with said seat back in its upright position will move said interconnected axis back over center with respect to said first and second link axes and thereby allow movement of said seat back to its folded position and
(2) pivotal movement of said handle with said seat back in its folded position will move said interconnected axis back to a position of alignment with said seat back axis and said coincident link axes and thereby allow movement of said seat back to its upright position.

8. A seating assembly according to claim 6 and further including
(A) a spring arranged to be wound by pivotal movement of said second link on said second link axis occurring in response to the aforesaid movement of said interconnected axis in said opposite direction along said arc to its position of alignment with said coincident axes and said seat back axis.

9. In a motor vehicle body of the type including a floor having an elevated cargo-carrying portion:
(A) a vehichle seat comprising
(1) a seat bottom and
(2) a seat back;
(B) means mounting said seat back on said body for pivotal movement between
(1) a generally upright seating position wherein said seat back extends upwardly above said elevated floor portion adjacent thereto and
(2) a generally horizontal folded position wherein said seat back is substantially flush with said elevated floor portion;
(C) a first link pivoted at one end about a first link axis located on said body generally forwardly of the pivotal axis of said seat back and at a given distance therefrom;
(D) a second link having the same effective length as said first link and pivoted at one end about a second link axis
(1) located on said seat back at said given distance from said seat back axis and
(2) spaced, with said seat back in its said upright seating position, generally above said seat back axis; and
(E) means pivotally interconnecting the free ends of said first and second links, said links being of such a dimension and oriented so that as said seat back is pivoted forwardly toward its folded position, said second link axis moves into a position of coincidence with said first link axis; and
(F) spring means operative in response to the aforesaid movement of said second link axis into coincidence with said seat back axis to pivot said links downwardly together about their coincident axes to move the pivotal axis of their interconnecting ends to an over center position with respect to said coincident axes and said seat back axis and thereby resist displacement of said seat back from its said folded position.

10. In a motor vehicle body of the type including a floor having an elevated cargo-carrying portion:
(A) a vehicle seat comprising
(1) a seat bottom and
(2) a seat back;
(B) means mounting said seat back on said body for pivotal movement between
(1) a generally upright seating position wherein said seat back extends upwardly above said elevated floor portion adjacent thereto and
(2) a generally horizontal folded position wherein said seat back is substantially flush with said elevated floor portion;
(C) a first link pivoted at one end about a first link axis located on said body generally forwardly of said seat back axis and at a given distance therefrom;
(D) a second link having the same effective length as said first link and pivoted at one end about a second link axis
(1) located on said seat back at said given distance from said seat back axis and
(2) spaced, with said seat back in its said seating position, generally above said seat back axis;
(E) means pivotally interconnecting the free ends of said first and second links, said links being of such a dimension and oriented so that as said seat back is pivoted forwardly toward its folded position, said second link axis moves along an arc centered on said seat back axis into a position of coincidence with said first link axis and said second link is pivoted in a given direction about said second link axis to move the pivotal axis of the interconnected link ends into a position of alignment with said seat back axis and the coincident link axes, whereafter said second link may reverse its direction of pivotal movement and pivot with said first link downwardly about the coincident link axes to move the interconnected pivotal axis to an over center position with respect to said coincident axes and said seat back axis and thereby resist displacement of said seat back from its said folded position; and
(F) a spring arranged to be wound in response to pivotal movement of said second link about said second link axis in said given direction, whereby said spring unwinds as said link axes move into coincidence to assist the dowward pivotal movement of said links.

11. A seat assembly according to claim 10
(A) which further includes (1) a shaft journalled in said seat back on said second link axis; and (2) means fixing said one end of said second link to an end of said shaft; and (B) wherein said spring comprises a coil spring wound around said shaft and fixed at one end to said seat back and at its other end to said shaft.

12. In a motor vehicle body of the type including a floor having an elevated cargo-carrying portion:

(A) a vehicle seat comprising
   (1) a seat bottom and
   (2) a seat back;

(B) means mounting said seat back on said body for pivotal movement between
   (1) a generally upright seating position wherein said seat back extends upwardly above said elevated floor portion adjacent thereto and
   (2) a generally horizontal folded position wherein said seat back is substantially flush with said elevated floor portion;

(C) a first link pivoted at one end about an axis located on said body generally forwardly of the pivotal axis of said seat back and at a given distance therefrom;

(D) a shaft
   (1) journalled in said seat back on an axis located at said given distance from said seat back axis and spaced, with said seat back in its said seating position, generally above said seat back axis and
   (2) extending at its opposite ends beyond the respective side faces of said seat back; and (E) a second link fixed to one end of said shaft and having the same effective length as said first link;

(F) means pivotally interconnecting the free ends of said first and second links, said links being of such a dimension and oriented so that as said seat back is pivoted forwardly toward its folded position, said shaft axis moves into a position of coincidence with said link axis, whereby to allow said links to thereafter pivot downwardly together about their coincident axes to move the pivotal axis of their interconnecting ends to an over center position with respect to said coincident axes and said seat back axis and thereby resist displacement of said seat back from its said folded position; and (G) a handle fixed to the other end of said shaft for raising the interconnected link axis back to a position of alignment with said seat back axis and said coincident axes, whereafter said seat back may be raised to its upright position.

13. A seating assembly according to claim 12 and further including (A) a coil spring wound around said shaft and fixed at one end to said seat back and at the other end to said shaft.

14. In a motor vehicle body of the type including a floor having an elevated cargo-carrying portion:

(A) a vehicle seat comprising
   (1) a seat bottom and
   (2) a seat back;

(B) means mounting said seat back on said body for counterclockwise pivotal movement between
   (1) a generally upright seating position wherein said seat back extends upwardly above said elevated floor portion adjacent thereto and
   (2) a generally horizontal folded position wherein said seat back is substantially flush with said elevated floor portion;

(C) a first link pivoted at one end about an axis located on said body generally forwardly of the pivotal axis of said seat back and at a given distance therefrom;

(D) a shaft
   (1) journalled in said seat back on an axis located at said given distance from said seat back axis and spaced, with said seat back in its said seating position, generally above said seat back axis and
   (2) extending at its opposite ends beyond the respective side faces of said seat back;

(E) a second link fixed to one end of said shaft and having the same effective length as said first link;

(F) means pivotally interconnecting the free ends of said first and second links; said links being of such a dimension and oriented so that as said seat back is pivoted on its axis the axis of the interconnected link ends moves along an arc centered on said first link axis;

(G) first coacting stop surfaces on said links positioned to move into abutment as said interconnected axis moves counterclockwise along said arc through a position of alignment with said first link axis and said shaft axis to an over center position slightly beyond its aforesaid position of alignment, whereby to prevent further counterclockwise movement of said interconnected axis along said arc and thereby define the upright seating position of said seat back and prevent displacement of the latter from that position;

(H) second coacting stop surfaces on said links positioned to move into abutment as said interconnected axis moves clockwise along said arc to a position of alignment with said first link axis and said seat back axis, whereby said first and second links may thereafter pivot downwardly together about the coincident first link and shaft axes to move said interconnected axis further clockwise along said arc to an over center position with respect to said coincident axes and said seat back axes and thereby prevent displacement of said seat back from its said folded position;

(I) a handle fixed to the other end of said shaft and thereby effective
   (1) with said seat back in its folded position, to raise said interconnected axes back to a position of alignment with said seat back axis and said coincident axes to free said seat back for movement to its upright position and
   (2) with said seat back in its upright seating position, to move said interconnected axis back over center with respect to said first link and shaft axes to free said seat back for movement to its folded position; and (J) a coil spring wound around said shaft and fixed at one end to said seat back and at the other end to said shaft and being arranged to wind in response to counterclockwise pivotal movement of said second link on said shaft axis, whereby said spring unwinds to snap said interconnected axis over center as said seat back reaches its upright seating position and unwinds to assist in the joint downward pivotal movement of said links about said coincident axes as said seat back reaches its folded position.

15. A folding seat comprising
(A) a seat bottom;
(B) a seat back;
(C) means mounting said seat back for pivotal movement between
   (1) a generally upright seating position and
   (2) a generally horizontal folded position wherein said seat back overlies said seat bottom;
(D) a first link pivoted at one end about a first link axis
   (1) fixed with respect to the pivotal axis of said seat back and
   (2) located generally forwardly of said seat back axis and at a given distance therefrom;
(E) a second link having the same effective length as said first link and pivoted at one end about a second link axis
    (1) located on said seat back at said given distance from said seat back axis and
    (2) spaced, with said seat back in its said seating position, generally above said seat back axis; and
(F) means pivotally interconnecting the free ends of said first and second links, said links being of such a dimension and oriented so that as said seat back is pivoted forwardly toward its folded position, said second link axis moves into a position of coincidence with said first link axis, whereby to allow said links to thereafter pivot downwardly together about their coincident axes to move the pivotal axis of their interconnecting ends to an over center position with respect to said coincident axes and said seat back axis and thereby resist displacement of said seat back from its said folded position.

16. A seating assembly according to claim 15 and further including:
(A) a handle mounted for pivotal movement about said second link axis and fixed with respect to said second link, whereby pivotal movement of said handle raises the interconnected link axis back to a position of alignment with said seat back axis and said coincident axes, whereafter said seat back may be raised to its upright seating position.

17. A seat assembly according to claim 15 and further including:
(A) coacting stop surfaces on said links positioned to move into abutment as said second link axis moves into its position of coincidence with said first link axes, whereby to prevent movement of said second link axes past said first link axis.

18. A folding seat comprising
(A) a seat bottom;
(B) a seat back;
(C) means mounting said seat back for pivotal movement between
    (1) a generally upright seating position and
    (2) a generally horizontal cargo-carrying position wherein said seat back overlies said seat bottom;
(D) a first link pivoted at one end about a first link axis
    (1) fixed with respect to the pivotal axis of said seat back and
    (2) located generally forwardly of said seat back axis and at a given distance therefrom;
(E) a second link having the same effective length as said first link and pivotal at one end about a second link axis
    (1) located on said seat back at said given distance from said seat back axis and
    (2) spaced, with said seat back in its said upright seating position, generally above said seat back axis;
(F) means pivotally interconnecting the free ends of said first and second links, said links being of such a dimension and oriented so that as said seat back is pivoted toward its upright seating position the pivotal axis of the interconnected link ends moves in one direction along an arc centered on said first link axis and as said seat back is pivoted toward its folded position said interconnected axis moves in the opposite direction along said arc;
(G) first coacting stop surfaces on said links positioned to move into abutment as said interconnected axis moves in said one direction along said arc through a position of alignment with said first and second link axes to an over center position slightly beyond its aforesaid position of alignment, whereby to prevent further movement of said interconnected axis along said arc in said given direction and thereby define the upright position of said seat back and prevent displacement of the latter from that position; and
(H) second coacting stop surfaces on said links positioned to move into abutment as said interconnected axis moves along said arc in said opposite direction to a position of alignment with said first link axis and said seat back axis, whereby said first and second links may thereafter pivot downwardly together about the coincident first and second link axes to move said interconnected axis further along said arc in said opposite direction to an over center position with respect to said coincident axes and said seat back axis and thereby prevent displacement of said seat back from its said folded position.

19. A seating assembly according to claim 18 and further including
(A) a handle mounted for pivotal movement on said second link axis and fixed with respect to said second link, whereby
    (1) pivotal movement of said handle with said seat back in its upright position will move said interconnected axis back over center with respect to said first and second link axes and thereby allow movement of said seat back to its folded position and
    (2) pivotal movement of said handle with said seat back in its folded position will move said interconnected axis back to a position of alignment with said seat back axis and said coincident link axes and thereby allow movement of said seat back to its upright seating position.

20. A seating assembly according to claim 18 and further including
(A) a spring arranged to be wound by the pivotal movement of said second link on said second link axis occurring in response to the aforesaid movement of said interconnected axis in said opposite direction along said arc to its position of alignment with said coincident axes and said seat back axis.

21. A folding seat comprising:
(A) a seat bottom;
(B) a seat back;
(C) means mounting said seat back for pivotal movement between
    (1) a generally upright seating position and
    (2) a generally horizontal folded position wherein said seat back overlies said seat bottom;
(D) a first link pivoted at one end about a first link axis
    (1) fixed with respect to the pivotal axis of said seat back and
    (2) located generally forwardly of said seat back axis and at a given distance therefrom;
(E) a second link having the same effective length as said first link and pivoted at one end about a second link axis
    (1) located on said seat back at said given distance from said seat back axis and
    (2) spaced, with said seat back in its said seating position, generally above said seat back axis;
(F) means pivotally interconnecting the free ends of said first and second links, said links being of such a dimension and oriented so that as said seat back is pivoted forwardly toward its folded position said second link axis moves along an arc centered on said seat back axis into a position of coincidence with said first link axis and said second link is pivoted in a given direction about said second link axis to move the pivotal axis of the interconnected link ends into a position of alignment with said seat back axis and the coincident link axes, whereafter said second link may reverse its direction of pivotal movement and pivot with said first link downwardly about the coincident link axes to move the interconnected pivotal axis to an over center position with respect to said coincident axes and said seat back axis and thereby resist displacement of said seat back from its said folded position; and (G) a spring arranged to be wound in response to pivotal movement of said second link about said second link axis in said given direction, whereby said spring unwinds as said link axes move into coincidence to assist the downward pivotal movement of said links.

22. A seat assembly according to claim 21
(A) which further includes
 (1) a shaft journalled in said seat back on said second link axis and
 (2) means fixing said one end of said second link to an end of said shaft; and
(B) wherein said spring comprises a coil spring wound around said shaft and fixed at one end to said seat back and at its other end to said shaft.

23. A folding seat comprising
(A) a seat bottom;
(B) a seat back;
(C) means mounting said seat back for pivotal movement between
 (1) a generally upright seating position and
 (2) a generally horizontal folded position wherein said seat back overlies said seat bottom;
(D) a first link pivoted at one end about an axis
 (1) fixed with respect to the pivotal axis of said seat back and
 (2) located generally forwardly of said seat back axis and at a given distance therefrom;
(E) a shaft
 (1) journalled in said seat back on an axis located at said given distance from said seat back axis and spaced, with said seat back in its said seating position, generally above said seat back axis and
 (2) extending at its opposite ends beyond the respective side faces of said seat back;
(F) a second link fixed to one end of said shaft and having the same effective length as said first link;
(G) means pivotally interconnecting the free ends of said first and second links, said links being of such a dimension and oriented so that as said seat back is pivoted forwardly toward its folded position said shaft axis moves into a position of coincidence with said link axis, whereby to allow said links to thereafter pivot downwardly together about their coincident axes to move the pivotal axis of their interconnecting ends to an over center position with respect to said coincident axes and said seat back axis and thereby resist displacement of said seat back from its said folded position; and
(H) a handle fixed to the other end of said shaft for raising the interconnected link axis back to a position of alignment with said seat back axis and said coincident axes, whereafter said seat back may be raised to its upright position.

24. A seating assembly according to claim 23 and further including:
(A) a coil spring wound around said shaft and fixed at one end to said seat back and at the other end to said shaft.

25. A folding seat comprising
(A) a seat bottom;
(B) a seat back;
(C) means mounting said seat back for counterclockwise pivotal movement between
 (1) a generally upright seating position and
 (2) a generally horizontal folded position wherein said seat back overlies said seat bottom;
(D) a first link pivoted at one end about an axis
 (1) fixed with respect to the pivotal axis of said seat back and
 (2) located generally forwardly of said seat back axis and at a given distance therefrom;
(E) a shaft
 (1) journalled in said seat back on an axis located at said given distances from said seat back axis and spaced, with said seat back in its said seating position, generally above said seat back axis and
 (2) extending at its opposite ends beyond the respective side faces of said seat back;
(F) a second link fixed to one end of said shaft and having the same effective length as said first link;
(G) means pivotally interconnecting the free ends of said first and second links, said links being of such a dimension and oriented so that as said seat back is pivoted on its axis the axis of the interconnected link ends moves along an arc centered on said first link axis;
(H) first coacting stop surfaces on said links positioned to move into abutment as said interconnected axis moves counterclockwise along said arc through a position of alignment with said first link axis and said shaft axis to an over center position slightly beyond its aforesaid position of alignment, whereby to prevent further counterclockwise movement of said interconnected axis along said arc and thereby define the upright seating position of said seat back and prevent displacement of the latter from that position;
(I) second coacting stop surfaces on said links positioned to move into abutment as said interconnected axis moves clockwise along said arc to a position of alignment with said first link axis and said seat back axis, whereby said first and second links may thereafter pivot downwardly together about the coincident first link and shaft axes to move said interconnected axis further clockwise along said arc to an over center position with respect to said coincident axes and said seat back axes and thereby prevent displacement of said seat back from its said folded position;
(J) a handle fixed to the other end of said shaft and thereby effective;
 (1) with said seat back in its folded position, to raise said interconnected axes back to a position of alignment with said seat back axis and said coincident axes to free said seat back for movement to its upright position and
 (2) with said seat back in its upright seating position, to move said interconnected axis back over center with respect to said first link and shaft axes to free said seat back for movement to its folded position; and
(K) a coil spring wound around said shaft and fixed at one end to said seat back and at the other end to said shaft and being arranged to wind in response to counterclockwise pivotal movement of said second link on said shaft axis, whereby said spring unwinds to snap said interconnected axis over center as said seat back reaches its upright seating position and unwinds to assist in the joint downward pivotal movement of said links about said coincident axes as said seat back reaches its folded position.

References Cited
UNITED STATES PATENTS 2,926,949   3/1960   Himka et al. _____ 296—66
3,093,258   6/1963   Turner _____ 217—60

BENJAMIN HERSH, *Primary Examiner.*

J. A. PEKAR, *Assistant Examiner.*